(12) United States Patent
Chen et al.

(10) Patent No.: US 6,750,804 B2
(45) Date of Patent: Jun. 15, 2004

(54) SYSTEM AND METHOD FOR DETECTING AND ESTIMATING THE DIRECTION OF NEAR-STATIONARY TARGETS IN MONOSTATIC CLUTTER USING PHASE INFORMATION

(75) Inventors: Hai-Wai Chen, Tucson, AZ (US); Harry A. Schmitt, Tucson, AZ (US); George T. David, deceased, late of Oro Valley, AZ (US), by Judith L. David, executor; Dennis C. Braunreiter, Oro Valley, AZ (US); Alphonso A. Samuel, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/116,438

(22) Filed: Apr. 4, 2002

(65) Prior Publication Data

US 2003/0189512 A1 Oct. 9, 2003

(51) Int. Cl.⁷ .............. G01S 7/292; G01S 7/28; G01S 7/285; G01S 13/00
(52) U.S. Cl. ............. 342/89; 342/94; 342/118; 342/134; 342/135; 342/136; 342/149; 342/159; 342/175; 342/194; 342/195; 342/196; 356/3; 356/4.01
(58) Field of Search ............ 342/89–103, 159–164, 342/175, 195, 189–194, 196, 197, 25, 27, 28, 61, 62, 73, 74–81, 118, 134–144, 147, 149, 150, 151–154; 356/3, 4.01–5.15; 244/3.1–3.3

(56) References Cited

U.S. PATENT DOCUMENTS 4,296,415 A * 10/1981 Pelton et al. ............... 342/94
4,887,088 A * 12/1989 Beckett ....................... 342/159

* cited by examiner

Primary Examiner—Bernarr E. Gregory
(74) Attorney, Agent, or Firm—Thomas J. Finn; Leonard A. Alkov; Glenn H. Lenzen, Jr.

(57) ABSTRACT

A system and method for detecting a target. The inventive method includes the steps of receiving a complex return signal of an electromagnetic pulse having a real and an imaginary component; extracting from the imaginary component information representative of the phase component of the return signal; and utilizing the phase component to detect the target. Specifically, the phase components are those found from the complex range-Doppler map. More specific embodiments further include the steps of determining a power spectral density of the phase component of the return signal; performing a cross-correlation of power spectral density of the phase component of the return signal between different antenna-subarray (quadrant channels); and averaging the cross-correlated power spectral density of the low frequency components. In an alternative embodiment, the cross-correlation is performed on the phase component of the range-Doppler map directly. This signal can then be averaged to potentially provide improved detection of targets. The cross-correlations of the power spectral densities derived from the complex valued range-Doppler map are then used to detect the target in the presence of monostatic clutter. An additional teaching relates to a utilization of the phase component to ascertain a direction of the target and thereby effect target tracking as well as target detection.

20 Claims, 10 Drawing Sheets

FIG. 5 AMPLITUDE AND PHASE OF CLUTTER-ONLY AND CLUTTER-PLUS-TARGET SIGNALS
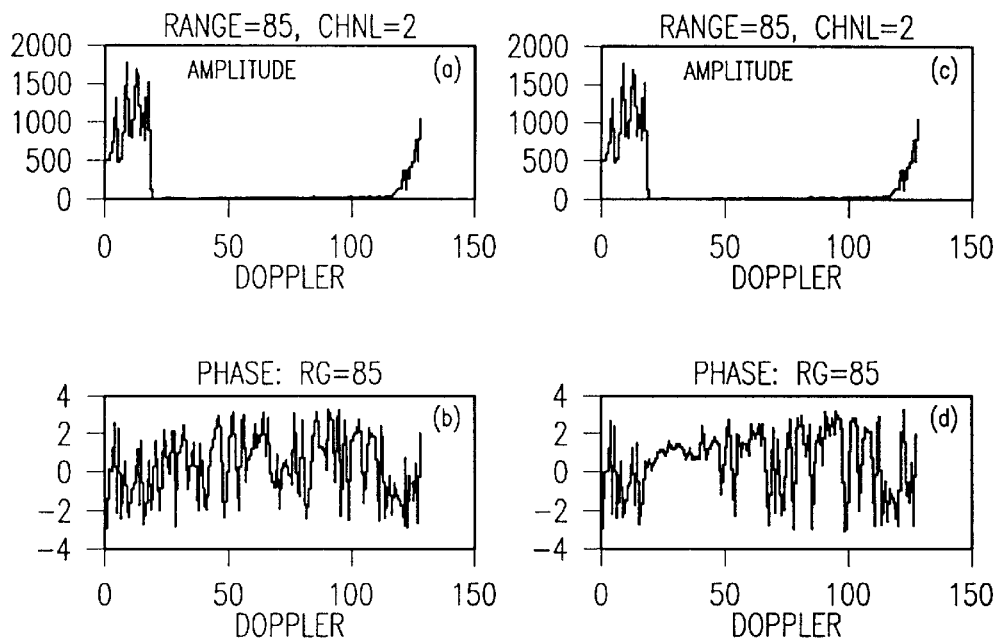
FIG. 6 TARGET DETECTION USING CROSS-CORRELATION FOLLOWED BY POWER SPECTRAL DENSITY ESTIMATION
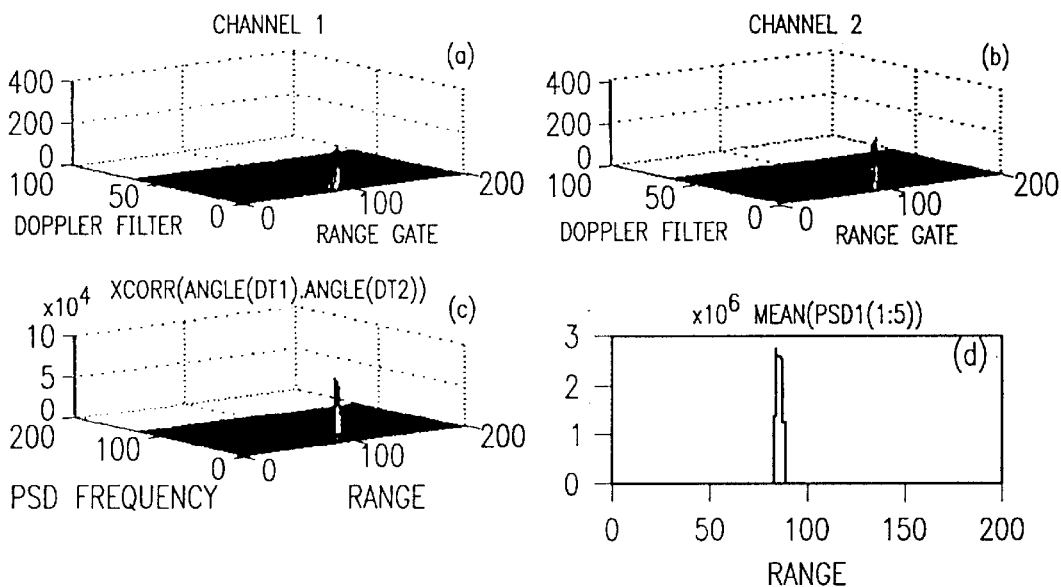

TARGET DETECTION USING CROSS-CORRELATION OF
TWO-CHANNEL POWER SPECTRAL DENSITIES

DOPPLER AVERAGING IMPROVE DETECTION PERFORMANCE

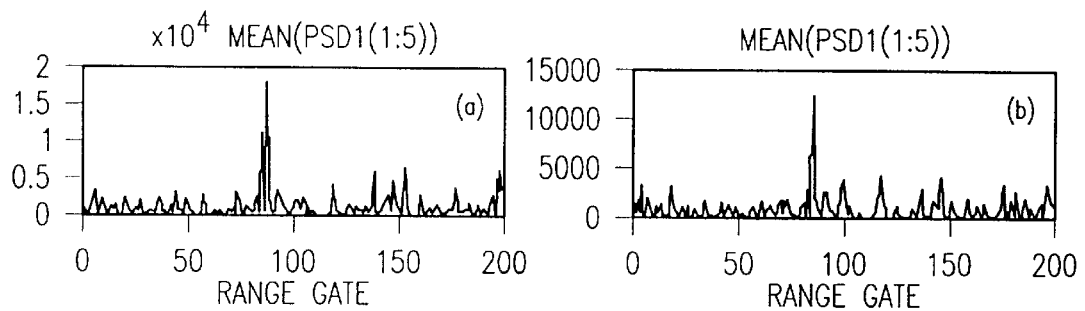
FIG. 11
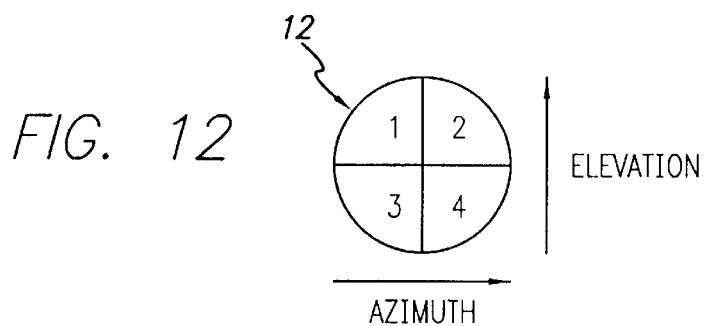
FIG. 12
FIG. 13
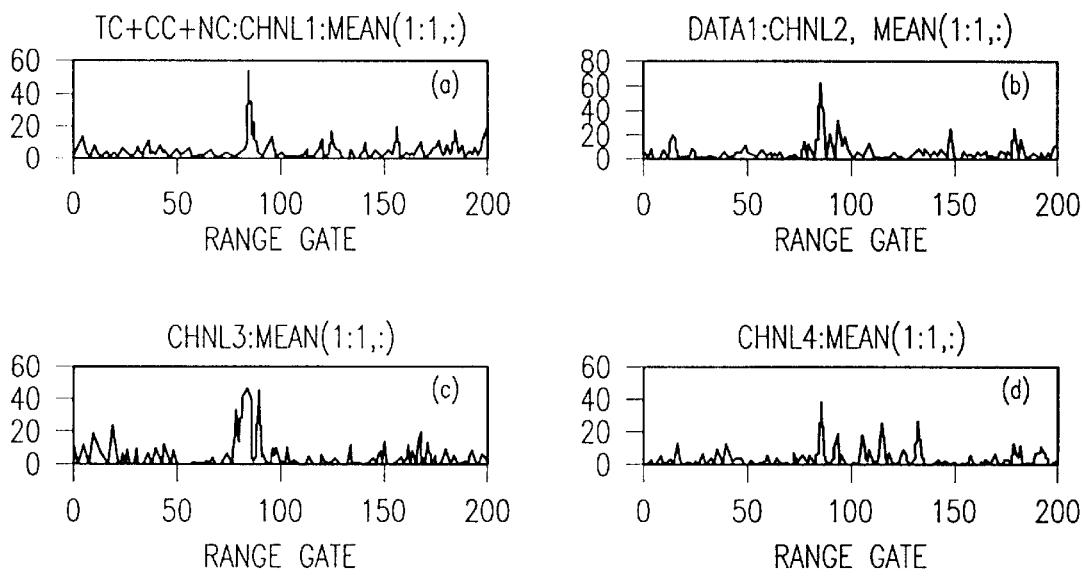

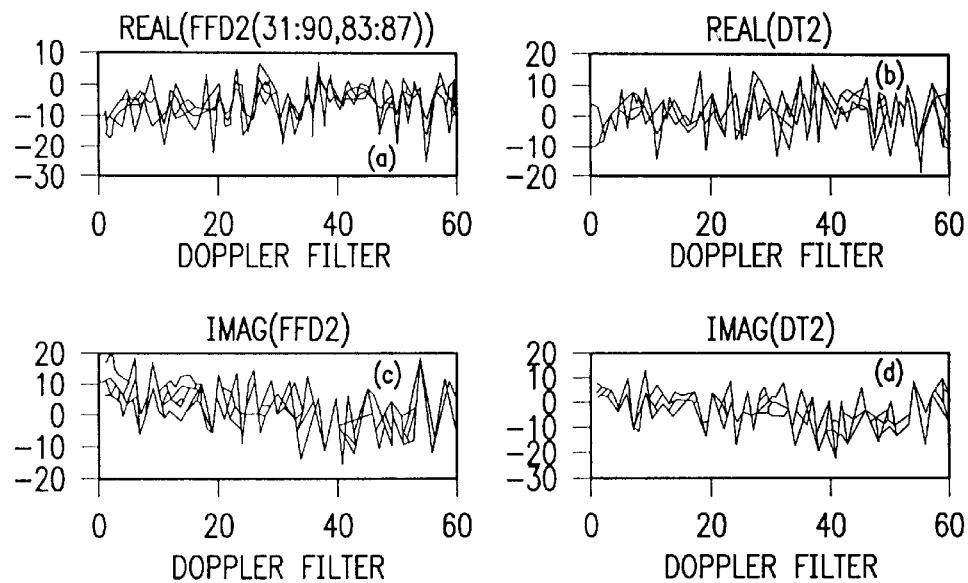
FIG. 17
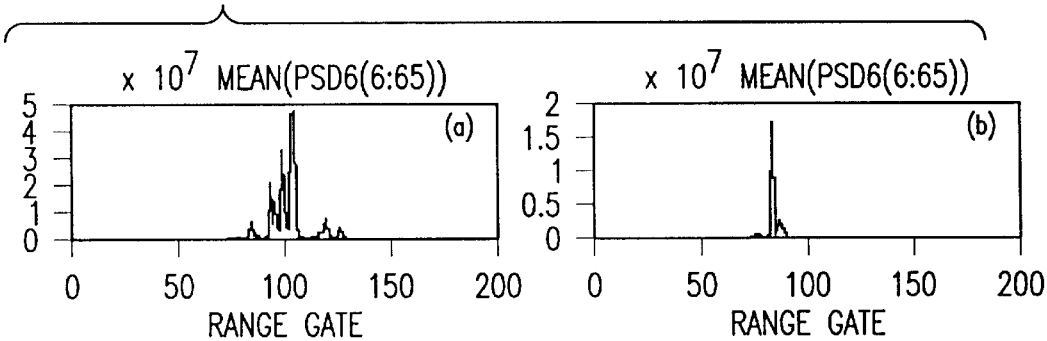
FIG. 18
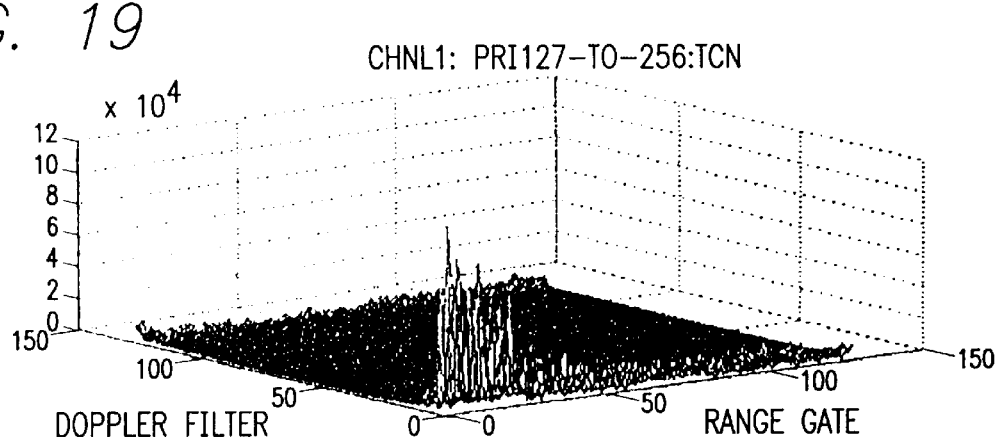

SYSTEM AND METHOD FOR DETECTING AND ESTIMATING THE DIRECTION OF NEAR-STATIONARY TARGETS IN MONOSTATIC CLUTTER USING PHASE INFORMATION

This invention was made with Government support under Contract No. F49620-98-C-0034 awarded by the U.S. Air Force. The U.S. Government therefore has certain rights in the invention disclosed herein.

BACKGROUND OF THE INVENTION

1. Field of the Invention

The present invention relates to electromagnetic seekers. More specifically, the present invention relates to systems and methods for detecting and tracking targets in clutter.

2. Description of the Related Art

Radio frequency (RF) detection of slowly moving or stationary targets in monostatic clutter is a problem that has recently generated a great deal of interest within the Defense community. Monostatic clutter is naturally produced by ground reflections of the radar's transmitted signal. Monostatic clutter is thus largest at zero relative Doppler. Monostatic clutter is particularly troublesome when trying to detect slowly moving target, since there is almost no Doppler difference between the clutter and the target. Exemplary targets include surface vehicles, launchers and loitering UAVs (Unmanned Airborne Vehicles). The root of the difficulty lies in the fact that conventional radar systems use Doppler information for detection and tracking functions. As is well-known in the radar art, the Doppler shift is a shift in the frequency of radar returns due to the velocity of the target relative to the velocity of the radar receiver. In the presence of clutter, conventional Doppler radar systems lose the ability to use the target's Doppler to discriminate it from the clutter. Indeed, the target need not even be nearly stationary for this to be a problem. Even a rapidly moving target can exhibit low Doppler relative to mainlobe clutter if its velocity vector is nearly perpendicular to the velocity vector of the observation platform.

For this reason, most air-to-ground missiles employ either a high-resolution radar seeker or an infrared (IR), electro-optic (EO) or laser-radar based (ladar) seeker. However, the inclusion of these seeker modes increases development and production costs of the host platform. Further, IR seekers exhibit more significant atmospheric limitations (smoke, fog, snow, and/or rain, etc.).

While a number of hardware solutions have been proposed, a need remains for an RF based solution that would provide the basis for an all-weather, dual-mission RF seeker, viz., detection/radar-parameter-estimation performance with respect to both stationary and nonstationary targets, to significantly extend the capability of currently fielded hardware. More specifically, there is a need in the art for a more effective system or method for detecting targets in clutter without relying on a Doppler shift calculation.

SUMMARY OF THE INVENTION

The need in the art is addressed by the system and method for detecting a target of the present invention. The inventive method includes the steps of receiving a complex return signal of an electromagnetic pulse having a real and an imaginary component; extracting from the imaginary component information representative of the phase component of the return signal; and utilizing the phase component to detect the target. Specifically, the phase components are those found from the complex range-Doppler map.

More specific embodiments further include the steps of determining a power spectral density of the phase component of the return signal; performing a cross-correlation of power spectral density of the phase component of the return signal between different antenna-subarray (quadrant channels); and averaging the cross-correlated power spectral density of the low frequency components. In an alternative embodiment, the cross-correlation is performed on the phase component of the range-Doppler map directly. This signal can then be averaged to potentially provide improved detection of targets. The cross-correlations of the power spectral densities derived from the complex valued range-Doppler map are then used to detect the target in the presence of monostatic clutter.

An additional teaching providing by the present invention relates to a utilization of the phase component to ascertain a direction of the target and thereby effect target tracking as well as target detection.

BRIEF DESCRIPTION OF THE DRAWINGS

FIGS. 5(a) and (b) show the amplitude and phase of a clutter return cut at r=85 in the Doppler-dimension, respectively.

FIGS. 5(c) and (d) show the amplitude and phase of a clutter return in addition to a point target and receiver noise.

FIG. 6 shows the effect of cross-correlating different channels then measuring PSD.

FIG. 11 show simulation results with reduced SNR in accordance with the present teachings.

FIG. 12 is a diagram showing a simplified view of a planar array antenna with 4 quadrant spatial channels.

FIG. 13 is a graph of simulation results showing the DC component from the PSD of phase functions.

FIG. 17 shows the linear de-trending of complex-valued range-Doppler map. The detrending algorithm is a standard numerical algorithm taken from MATLAB.

FIG. 18 is a diagram which illustrates target detection before and after de-trending in accordance with the inventive method.

FIG. 19 is a diagram showing the range-Doppler function of illustrative radar clutter return data using a PRI length from 127 to 256.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

In conventional monopulse radio frequency (RF) seekers, only the amplitudes of the complex-valued range/Doppler-filter outputs are used for target detection and/or identification. The random-like phases of the range/Doppler-filter output values are seldom considered helpful for this purpose. However, as stated by Rihaczek and Hershkowitz in *Radar Resolution and Complex Image Analysis*, by A. Rihaczek and S Hershkowitz, Artech House, 1996, it is essential to utilize the whole complex-valued range-Doppler image rather than only the intensity (amplitude) image because a large part of the information about the target is contained in the phase of the image in addition to the amplitude. Nonetheless, there are two at least two reasons why phase data has not been used for target detection. First, traditionally a window function is used before the Fast Fourier Transform (FFT) of the range-Doppler image to suppress the side-lobe peaks. The window function will cause low frequency components from the clutter in the phase domain and thus make the extraction of target phase signals much more difficult. As discussed herein, in accordance with the present teachings, an FFT is applied directly on the original RF signals without convolving any window function.

Secondly, the leakage of Doppler FFT will also generate strong low frequency components caused by the clutter leakage in the phase domain. However, as discussed more fully below, a de-trending step is used, in accordance with the present teachings, to effectively reduce clutter leakage.

Figure 1A:
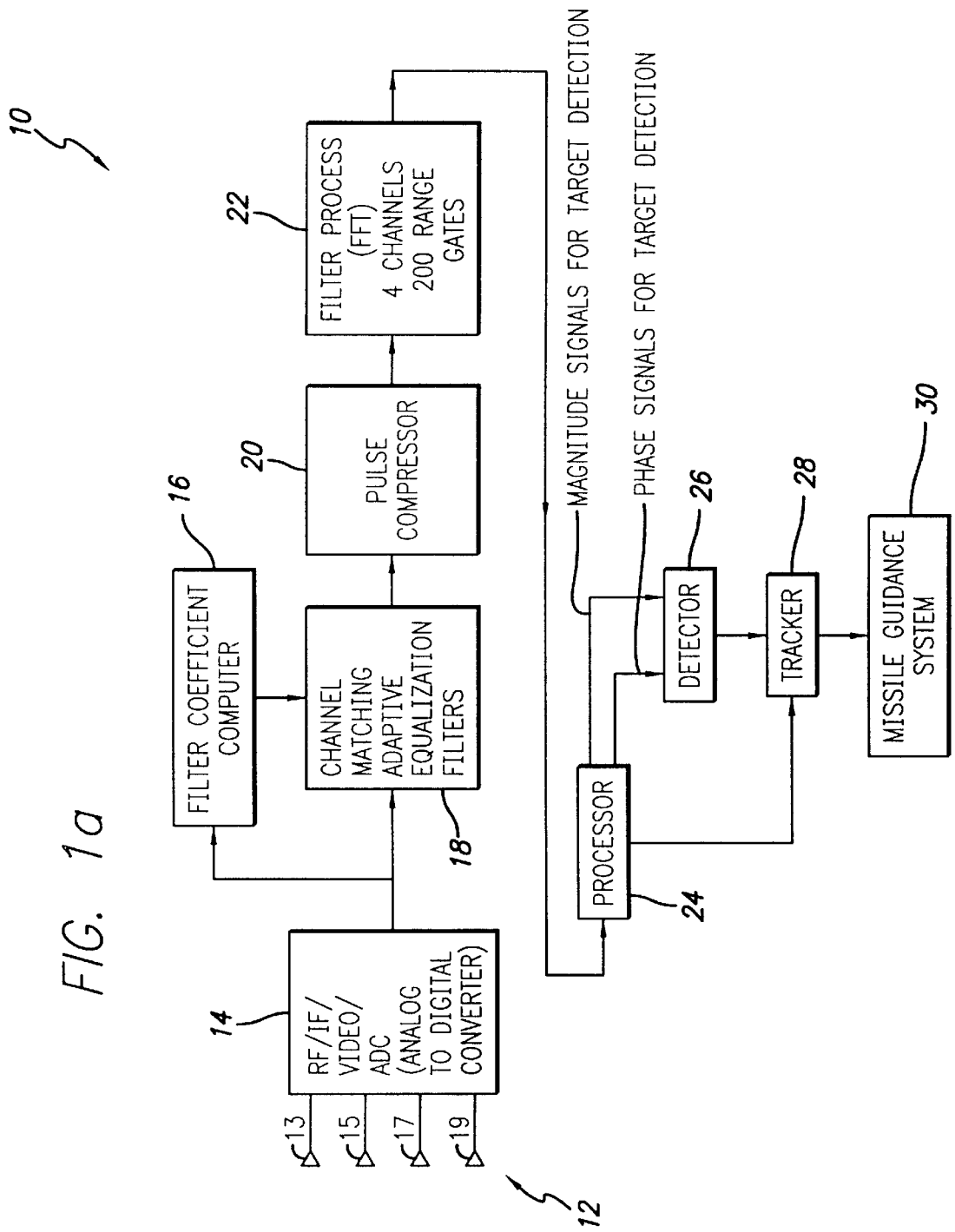
FIG. 1a is a simplified block diagram of a radar system implemented in accordance with the teachings of the present invention.

FIG. 1a is a simplified block diagram of a radar system implemented in accordance with the teachings of the present invention. Those skilled in the art will appreciate that the present teachings are not limited to radar applications. The teachings provided herein should also have utility in synthetic aperture radar (SAR), Interferometric SAR (ISAR), LADAR and other imaging applications. The system 10 includes a conventional four quadrant (four channel) radar antenna 12 having radiating elements 13, 15, 17 and 19. The antenna 12 feeds a conventional RF to IF to video analog-to-digital converter 14. Baseband video is fed to a conventional radar filter coefficient computer 16 and a set of channel matching adaptive equalization filters 18. The filters 18 provide gain matching signal processing in a conventional manner. The outputs of the filters 18 feed a pulse compression unit 20 which serves to improve the signal-to-noise ratio (SNR) in a conventional manner. An FFT 22 then extracts the Doppler signals from each channel for each of a number (e.g. 200) of range gates.

In accordance with the present teachings, a processor 24 operates on the output of the FFTs 22 and provides a set of Doppler range maps as discussed more fully below. The processor 24 outputs conventional target magnitude data to a target detector 26 and target phase data to the detector 26 and a target tracker 28. The target tracker 28 provides signals to a missile guidance system shown generally at 30.

The system 10 of FIG. 1a receives a complex return signal of an electromagnetic pulse having a real and an imaginary component; extracts from the imaginary component information representative of the phase component of the return signal; and utilizes the phase component to detect the target. An additional teaching providing by the present invention relates to the utilization of the phase component to ascertain a direction of the target and thereby effect target tracking as well as target detection.

The teachings of the present invention are best illustrated with respect to the following. In a detection system, skin target data received through the $k^{th}$ channel by the $m^{th}$ pulse in the appropriate nth range-gate are expressed as:

$$X_{skin}(k, n, m) = \left(\frac{R_0}{R_t}\right)^2 e^{-j[2\pi f_{Di}[(m-1)T_{pn}+(n_i-1)T_s]-2\pi f\frac{2R}{c}t+\varphi]} [e^{j\Phi_k}]_{k=1}^4 \quad (1)$$

where, $R_0$=range at which signal-to-noise ratio (SNR) is 0 dB, $R_t$=range to target, $f_{Dt}$=Doppler frequency of target, f=transmit frequency, $T_{pri}$=pulse repetition interval, $T_s$=sample interval, $\Phi$=random starting phase, $\Phi_k$=spatial phase at subarray k, and c=speed of light.

Although the skin target is modeled as a "point target", that is, a single scatterer exhibiting a fixed radar cross section, the model can be easily extended to include multiple distributed scatterers. As an example, a simple extension comprises two closely spaced point scatterers separated by a distance 1<Δn (range-gate resolution) and exhibiting equal Doppler frequency. The observed phase differences, $\Phi_d$, is a function of the distance 1 projected along the radar illumination path, and the processor's spectral location. Then, the model for a two-scatterer target can be expressed as $$X(k, n, m)=X_1(k, n, m, \Phi)+X_2(k, n\pm1, m, \Phi\pm\Phi_d) \quad (2)$$

where the plus/minus sign depends on the second scatterer being in front of or behind the first scatterer. Similarly, more generalized targets with multiple scatterers (more than two) distributed in a 3-D space can be modeled.

Receiver noise is modeled as spatio-temporally white Gaussian noise.

Monostatic Clutter Model

The illustrative clutter model uses scattering coefficients based on calibrated scatterometer data as found in the *Handbook of Radar Scattering Statistics for Terrain* by Ulaby and Dobson. This data consists of the mean and variance of the co- and cross-polarization Radar Cross Section (RCS) magnitude for a variety of terrain types, frequency bands and grazing angles. For this simulation, curve-fit parameters for the mean and variance of the RCS were as follows:

$$\mu=P1+P2*\exp(-P3*\theta)+P4*\cos(P5*\theta+P6) \quad (3)$$

$$sd=M1+M2*\exp(-M3*\theta) \quad (4)$$

where P1, P2, P3, P4, P5, P6, and M1, M2, M3 are coefficients for parameter fits, θ is the angle of incidence in radians, $\mu$ is the mean of the RCS, and sd is the standard deviation of the RCS.

Figure 1B:
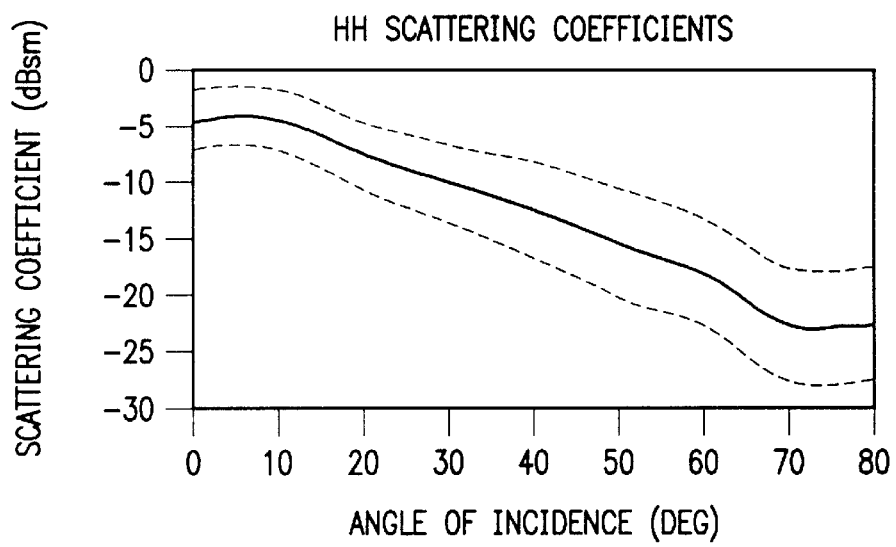
FIG. 1b shows the clutter-scattering coefficient versus incidence angle for grass.

FIG. 1*b* shows the clutter-scattering coefficient versus incidence angle for grass. The mean clutter-scattering coefficient and the spread corresponding to one standard deviation are shown. The curve fits for the co- and cross-polarization clutter backscatter mean and standard deviation are used in the clutter model to provide a geometry-dependent clutter power calculation for each range-Doppler cell. Once the mean and standard deviations are found for the particular clutter cell under consideration, random numbers are drawn from the desired probability distribution in order to obtain a clutter backscatter coefficient ($\sigma$)

$$\sigma = \mu + (rv)*sd \tag{5}$$

where, $\sigma$ is the clutter backscatter coefficient, $\mu$ is the mean of the clutter backscatter coefficient for the current clutter geometry, rv is a random number drawn from the appropriate distribution, and sd is the clutter standard deviation. Gaussian, Weibull and Lognormal distributions were used to characterize various types of clutter.

Once the backscatter coefficients have been determined, the clutter model (as shown below) calculates the clutter cell area ($A_i$) based on the current missile/target geometry, range-gate size and antenna beamwidth. The product of this clutter cell area and the backscatter coefficient gives the clutter cell radar cross section which is used in the radar range equation to calculate received clutter power. Clutter data received through the kth channel by the mth pulse in the nth range-gate are expressed as:

$$X_{clutter}(k, n, m) = \sum_i \sqrt{CNR_0(R_i)}\, \sigma_i A_i e^{-j\left[2\pi f_{Di}[(m-1)T_{pn} + (n-1)T_s] - 4\pi f \frac{R_i}{c} + \varphi\right]} [e^{j\Phi_k}]_{k=1}^4 \tag{6}$$

where, $R_i$=range to the $i^{th}$ patch, $CNR_0(R_i)$=clutter-to-noise ratio for a 0dBsm patch at range Ri, $\sigma_{i=clutter\ backscatter\ coefficient\ for\ ith\ patch} = \mu_{i+sdi}*rv$, $A_i$=projected area of ith patch, $f_{Di}$=Doppler frequency associated with the ith patch, f=transmit frequency, $T_{pri}$=pulse repetition interval, $T_s$=sample interval, $\Phi$=Random starting phase, $\Phi_{ki}$=spatial phase at subarray k, for the ith patch. Clutter demonstrates long-term correlation spreading across PRIs.

The relative geometry for each clutter cell determines its Doppler, range and spatial direction vector all of which are used along with the clutter power to construct a spatial covariance matrix for each range-Doppler cell. This covariance matrix is then convolved with the pulse-compression, video filter and amplitude-weighted Fourier transform correlation functions. The resulting covariance matrices are used to construct either stochastic range-Doppler maps or the corresponding stochastic time series data.

TARGET DETECTION USING PHASE INFORMATION

Frequency Analysis of Phase Estimates along the Doppler Direction

A representative case where the RF target signal is totally embedded in strong monostatic clutter can be simulated. Illustrative missile radar parameters are listed in Table 1.

TABLE 1

Illustrative Clutter and Radar Parameters

| Parameter | Value |
|---|---|
| Waveform | 15 chip bi-phase code |
| Antenna | 10 GHz |
| No. of Channels | 6"slotted planar array |
| | (4 co-polarized, 4 cross-polarized |
| Clutter type | Land |
| PRF | 33 kHz |
| Transmit frequency | 10 GHz |
| Sample frequency | 8 MHz |
| No. of pulses per CPI | 128 |
| No. of rangegates | Maximum of 100 |
| Target RCS | −10, −5, 0 dBsm |
| Ro | 15 km (with −10 dBsm target) |

Figure 2:
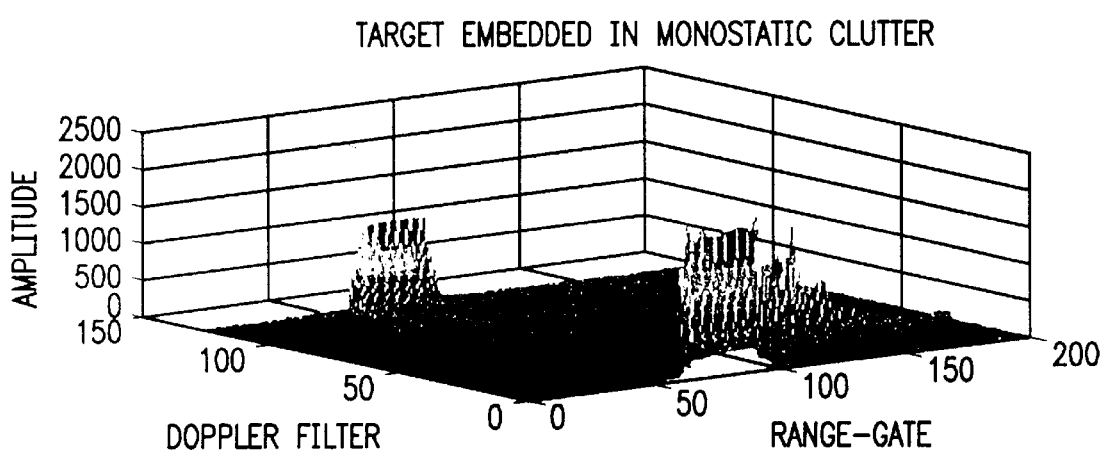
FIG. 2 shows the amplitude of a range-Doppler map resulting from a simulation of an illustrative embodiment of the present teaching.

FIG. 2 shows the amplitude of a range-Doppler map resulting from a simulation of an illustrative embodiment of the present teaching. Only the four co-polarized antenna-quadrant (channel) data are used. The selected range-gate resolution was 40 meters. Within each PRI, there were 200 contiguous range samples with a range-sample interval of 20 meters which represents one half of the range-filter resolution. A normal level electronic (thermal) noise was also included (noise floor with null limit (dB)=8.69E-10). A point target was located 1,700 meters from the missile with a low Doppler frequency of 2.38K Hz. Since the interval between Doppler filters was 258 Hz (=33K Hz/128), the major energy of this point target was centered at the range-Doppler cell (r=85, d=9).

FIG. 2 shows that a target that is totally embedded in the strong clutter returns would be difficult if not impossible to detect using conventional teachings. The signal-to-clutter-plus-noise-ratio (SCNR) at cell (85,9) was approximately −10 dB. Therefore, the range-Doppler map in the amplitude-domain could not provide enough information for detecting the target when there is strong clutter returns. The question is what additional information can one gain in the phase domain.

Figure 3:
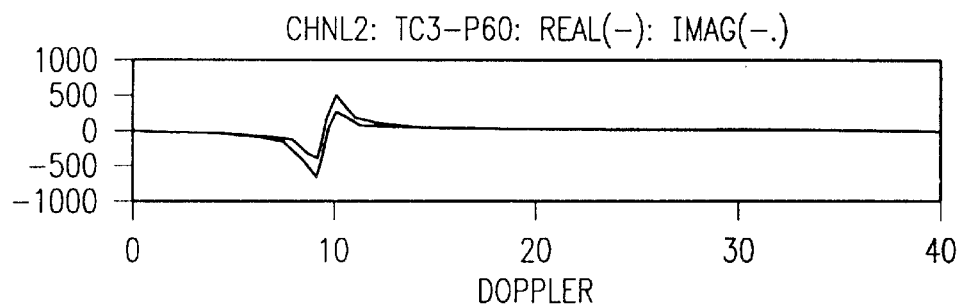
FIG. 3 shows real and imaginary values of a point target along the Doppler direction.
Figure 4A:
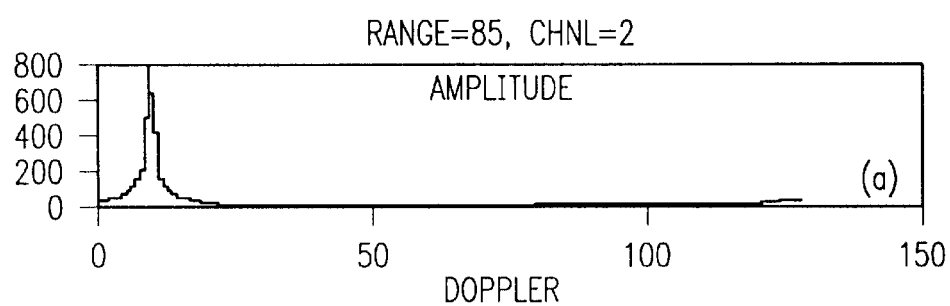
FIG. 4 shows amplitude and phase of the point target of FIG. 3.

FIG. 3 shows real and imaginary values of a point target along the Doppler direction. The real (solid line) and imaginary (dash-dotted line) 1-D slices T(85,d) are cut at r=85 along the Doppler direction from the complex-valued 2-D range-Doppler map T(r,d) of a point target centered at cell (85,9). The amplitude and phase can be calculated from the real and imaginary curves in FIG. 3. They are plotted in FIGS. 4*a* and 4*b*, respectively.

Figure 4B:
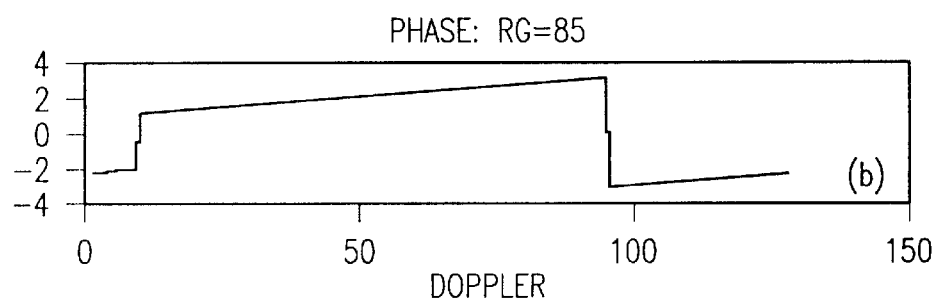

FIG. 4 shows amplitude and phase of the point target of FIG. 3. The phase is wrapped between $\pi$ and $-\pi$. Note that the phase curve has a $\pi$-jump at the location of the peak amplitude (d=9), and then gradually increases (or decreases). Obviously from FIG. 4*b*, the phase function of a point target in the Doppler-dimension will contain strong low frequency components if a spectrum analysis is performed on this function. On the other hand, the phase function of a monostatic clutter return generally contains high frequency components.

FIGS. 5(*a*) and (*b*) show the amplitude and phase of a clutter return cut at r=85 in the Doppler-dimension, respectively. There are strong monostatic clutter returns in the amplitude domain from Doppler d=0 to d=20 as shown in FIG. 5(*a*). However, the phases of the clutter returns are quite random as indicated in FIG. 5(*b*), and thus contain high frequency components.

FIGS. 5(*c*) and (*d*) show the amplitude and phase of a clutter return in addition to a point target and receiver noise.

Obviously, the target can not be detected in the amplitude-domain (compare FIG. 5(a) with 5(c)). On the other hand, as indicated in FIG. 5(d), low frequency components caused by the point target can be observed in the phase-domain. These results suggest that one may detect targets by measuring the low frequency components in the phase-domain using spectrum analysis.

Methods for Detecting Targets in Phase-Domain

The present invention provides a system and method for detecting targets in phase-domain. The low frequency components are extracted by PSD (power spectral density) measurements. Clutter returns and receiver noise are further suppressed by cross-correlation analysis between space (antenna-quadrant) channels. Welch's method is used for estimating PSD (as used in Matlab Signal Processing tool). Two methods for target detection are disclosed herein.

Method 1 for Target Detection

PSDs are measured in the Doppler-dimension of the range-Doppler map in the phase-domain.

FIG. 6 shows the effect of cross-correlating different channels then measuring PSD. FIGS. 6(a) (channel 1) and 6(b) (channel 2) show such PSDs for a point target. It is clear that the point target contains strong low frequency components. For further suppressing clutter and receiver noise, first cross-correlate the corresponding 1-D slices along the Doppler direction between two space-channels at the same range location:

$$T(r, j) = \sum_{d=0}^{N-1} T_1(r, d+j) T_2(r, d) \quad (7)$$

This operation will suppress clutter and receiver noise since the target signals in different channels have high correlation while the de-correlated clutter (due to distributed nature) and the uncorrelated receiver noise in different channels have much lower correlation. The PSD of the correlated function (Eq. (7)) is then measured. The result with respect to a point target is shown in FIG. 6(c). The first several low frequency components (e.g., from f=0 to f=4) are averaged, and the result is plotted in FIG. 6(d). Clearly, this averaging step can further suppress clutter and receiver noise.

Method 1 was verified using the representative simulated data. The RF signal included a point target, a strong clutter return, and a normal receiver noise. The simulation parameters were given above. The results are shown in FIG. 7.

Figure 7:
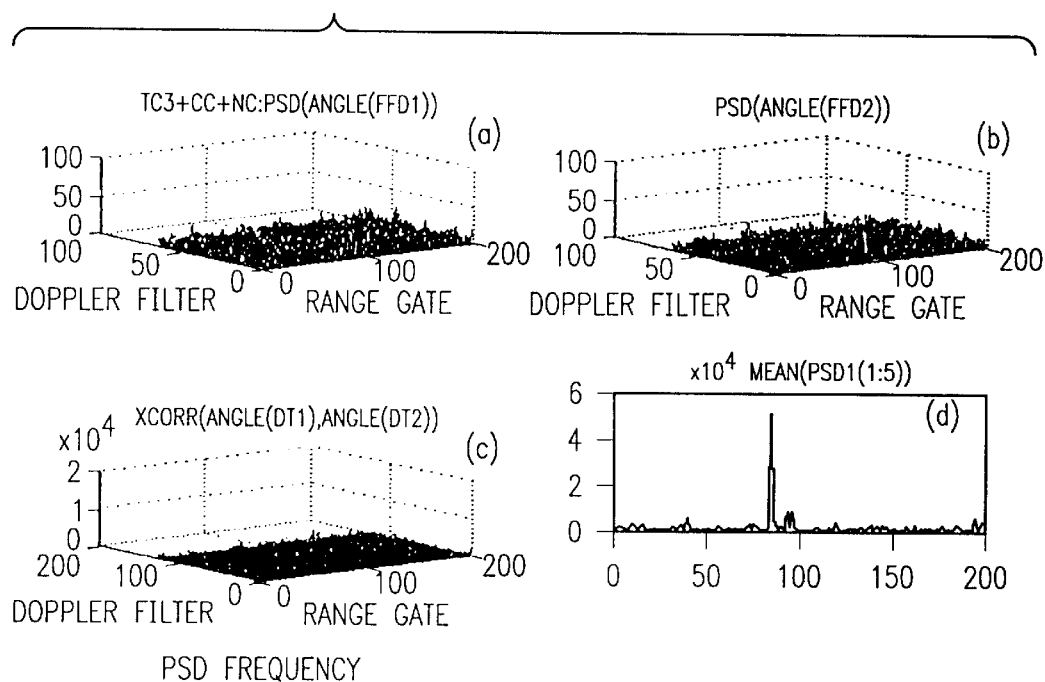
FIG. 7 is a series of graphs which illustrate the results of the first method for target detection of the present invention.

FIG. 7 is a series of graphs which illustrate the results of the first method for target detection of the present invention. FIG. 7(c) indicates that the cross-correlation process helped reduce clutter and receiver noise significantly. FIG. 7(d) shows that high SCNR can be obtained in the phase-domain even though the target is totally embedded in the monostatic clutter returns in the amplitude-domain.

Method 2 for Target Detection

In Method 2, PSDs are measured in the Doppler-dimension of the range-Doppler map for different space channels in the phase-domain. The measured PSD functions in different channels are then cross-correlated. Finally, a $2^{nd}$ PSD measurement is taken on the obtained cross-correlation function. Therefore, the difference between Methods 1 and 2 is that, in Method 1, the original phase functions are used for cross-correlation, while in Method 2 the PSDs of the original phase functions are used for cross-correlation. The results using Method 2 are shown in FIGS. 8 and 9.

Figure 8:
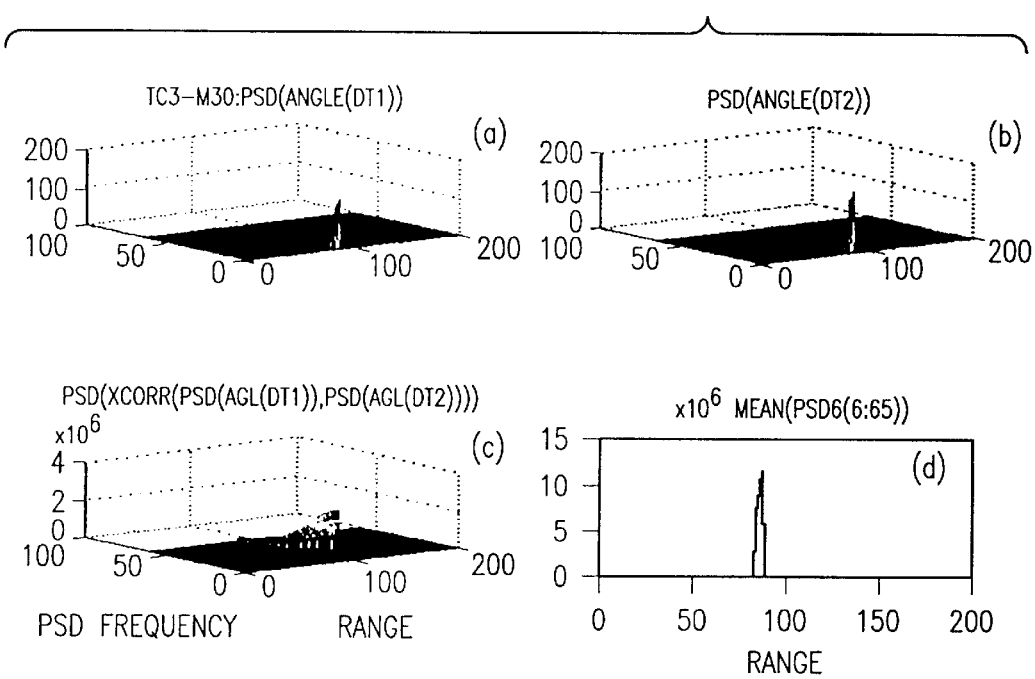
FIG. 8 shows the result of cross-correlating a measured PSD in different channels then measuring $2^{nd}$ PSD.

FIG. 8 shows the result of cross-correlating a measured PSD in different channels then measuring $2^{nd}$ PSD.

Figure 9:
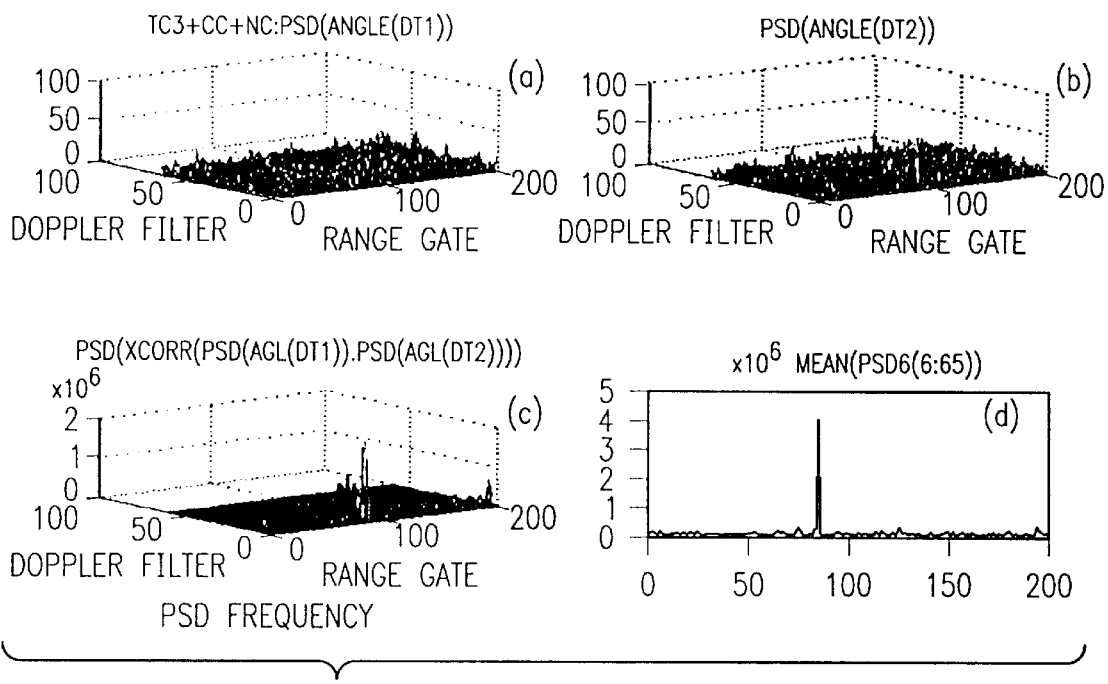
FIG. 9 shows the result of target detection using a method in accordance with the teachings of the present invention.

FIG. 9 shows the result of target detection using a method in accordance with the teachings of the present invention. In FIG. 8, a point target was used as the RF signal, while in FIG. 9 the RF signal included a point target, a strong clutter return, and a normal receiver noise. FIGS. 8(a) and 9(a) show the $1^{st}$ PSDs of channel 1 and FIGS. 8(b) and 9(b) show the $1^{st}$ PSDs of channel 2. FIGS. 8(c) and 9(c) show the $2^{nd}$ PSDs of the cross-correlations between the $1^{st}$ PSDs of channels 1 and 2. FIGS. 8(c) and 9(c) show that the power of the target stays high from low PSD frequencies to high PSD frequencies. On the other hand, the power of the clutter and receiver noise does not stretch to higher PSD frequencies. Therefore, the clutter and receiver noise can be suppressed further by averaging the power along the PSD frequency axis starting from a little higher frequency as shown in FIGS. 8(d) and 9(d). The averages in these plots were taken from PSD frequency sample number 6 to number 65.

Improvement of Target Detection Using Phase Estimates

In general, Method 2 can obtain a higher signal-to-clutter-plus-noise-ratio (SCNR) than Method 1 as indicated in FIGS. 7(d) and 9(d). More quantitative analysis on the simulated data shows that in the amplitude-domain the target is undetectable and is totally embedded in the strong monostatic clutter returns with very low SCNR (0.27, or −11.4 dB). Nevertheless, the target can be easily detected in the phase-domain. The SCNR is 25.4 dB (or 18.7) using Method 1 as shown in FIG. 7(d), and is 34.6 dB (or 53.7) using Method 2, as shown in FIG. 9(d). Therefore, a 30–40 dB gain in SCNR was achieved when using phases (as opposed to amplitude) estimates.

Targets with Multiple Scatterers and Multiple Point Targets

In this simulation, an extended target with two scatterers separated 10 meters along the range direction was used.

Figure 10:
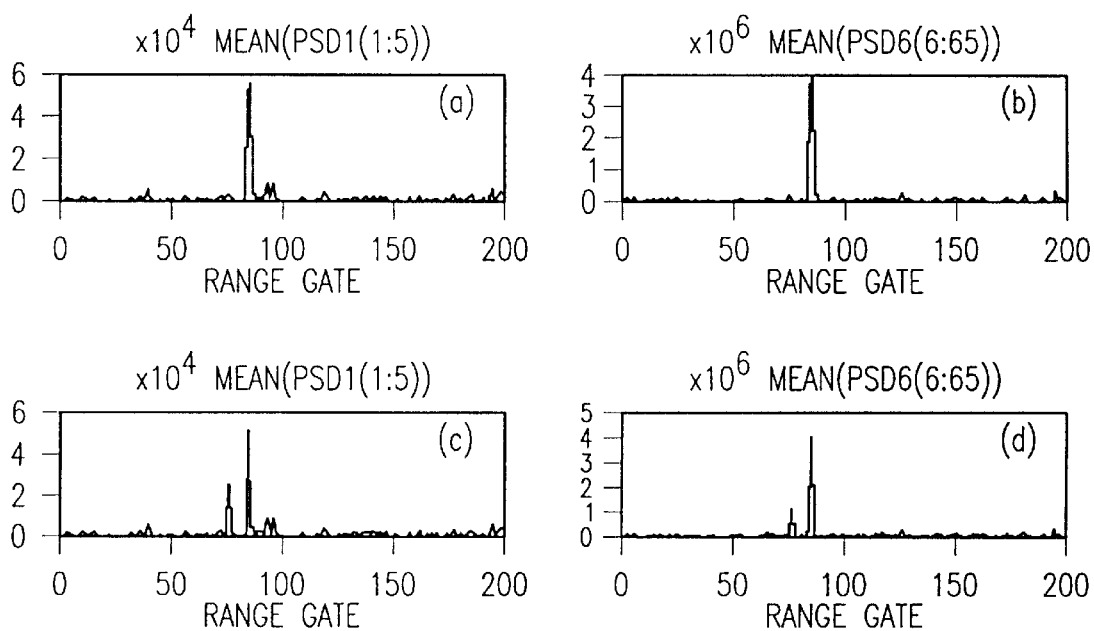
FIG. 10 shows simulation results with respect to a target with multiple scatterers and multiple point targets.

FIG. 10 shows simulation results with respect to a target with multiple scatterers and multiple point targets. This target model was discussed and presented in above with respect to Eq. (2). The target intensity was centered at r=85 and r=86 with Doppler d=9. Other parameters of this simulation are the same as the previous simulation. The results are shown in FIGS. 10(a) (Method 1) and 10(b) (Method 2). Both methods can easily detect the extended target at range-gates r=85 and r=86. This result indicates that the present methods can be applied to more extended targets other than the simple point-target.

RF signals containing multiple point targets separated at nearby range-gates have also been simulated. Based on the previous simulation using a single point target located at r=85, another point target located at r=76 was added. Results were obtained and plotted in FIGS. 10(c) (Method 1) and 10(d) (Method 2). It is seen that both Method 1 and 2 can be used for detecting multiple point targets.

Target Detection with Reduced SNR

In the first simulation using the point target described above, the receiver noise was increased intensity by a factor of 5 and 10 to test the robustness of the present methods in reduced SNR (5 and 10 times lower than the normal level).

FIG. 11 show simulation results with reduced SNR in accordance with the present teachings. The results using Method 1 are shown in FIGS. 11(a) (SNR reduced 5 times) and 11(b) (SNR reduced 10 times). Although the noise level is higher, it was still possible to detect the target at range-gate r=85. In general, it was found that Method 1 was more robust than Method 2 in the reduced SNR situation.

TARGET DIRECTION ESTIMATION USING PHASES

For a monopulse radar, after detecting the target the next task will be to estimate the target direction.

FIG. 12 is a diagram showing a simplified view of a planar array antenna with 4 quadrant spatial channels. As shown in FIG. 12, the target direction is measured by the EL (elevation) and AZ (azimuth) angles, which are directly related to the phase differences between the antenna-quadrant spatial channels. That is, for the EL direction: $\theta_{13}=\Phi_1-\Phi_3=\theta_{24}=\Phi_2-\Phi_4$, where $\Phi_1$, $\Phi_2$, $\Phi_3$, and $\Phi_4$ are the target phases at the 4 antenna-quadrant channels. For the AZ direction: $\phi_{12}=\Phi_1-\Phi_2=\phi_{34}=\Phi_3-\Phi_4$. In accordance with the present teachings, the low frequency components used for target detection can be further used for target direction estimation.

As indicated in FIG. 4(b), the low frequency components (e.g., the DC component) depend on the shape of the phase function. Different initial target phases at different channels will change and move the phase functions up or down, and thus change the low frequency components. What is necessary is to scale the measured low frequency components down to the original phase values since the measured values have been scaled up by the cross-correlation and PSD operations. In accordance with the present teachings, two methods are disclosed to convert the measured low frequency components to phase differences between the spatial channels: the direct method and the cross-correlation method.

Direct Method

This method uses the low frequency components directly measured from each individual channel. The measured low frequency component values obtained by PSD operation are scaled back by:

$$\Phi_i = C_d P_i^{0.5} \quad (8)$$

where i=1, 2, 3, 4; $C_d$ is a scale constant; and $P_i$ is the measured low frequency component values.

Cross-Correlation Method

As discussed above, the cross-correlation operation between spatial channels can significantly suppress the clutter and receiver noise. As a first step, the measured low frequency component values are obtained first by cross-correlation then by PSD operations. There are six pairs of distinct cross-correlation functions, between the four antenna channels: $P_{12}$, $P_{13}$, $P_{14}$, $P_{23}$, $P_{24}$, and $P_{34}$. As per the direct method discussed above, the scaling equation is:

$$\varphi_{ij} = C_c P_{ij}^{0.5} \quad (9)$$

where $C_c$ is a scale constant. Therefore, for the elevation (EL) direction: $\theta_{13}=\Phi_{12}-\Phi_{32}=\Phi_{14}-\Phi_{34}$, and $\theta_{24}=\Phi_{21}-\Phi_{41}=\Phi_{23}-\Phi_{43}$. For the AZ direction: $\phi_{12}=\Phi_{13}-\Phi_{23}=\Phi_{14}-\Phi_{24}$ and $\phi_{34}=\Phi_{31}-\Phi_{41}=\Phi_{32}-\Phi_{42}$.

The true phase differences of the point-target are $\theta_{13}=\theta_{24}=0.46$ (radian) and $\phi_{12}=\phi_{34}=-0.13$ (radian). For the direct method, $P_i$ in Eq.(8) used the values of the DC component at range r=85 of the 4 channels, as shown in FIG. 13.

FIG. 13 is a graph of simulation results showing the DC component from the PSD of phase functions. The scale constant in (8) is estimated as $C_d=0.25$. Channel 3 is quite noisy, and thus we used the other 3 channels to estimate the phase differences. The estimated phase differences are $\theta_{24}=\Phi_2-\Phi_4=0.41$ (radian) and $\phi_{12}=\Phi_1-\Phi_2=-0.16$ (radian). The estimation error is about 10–20%.

Figure 14:
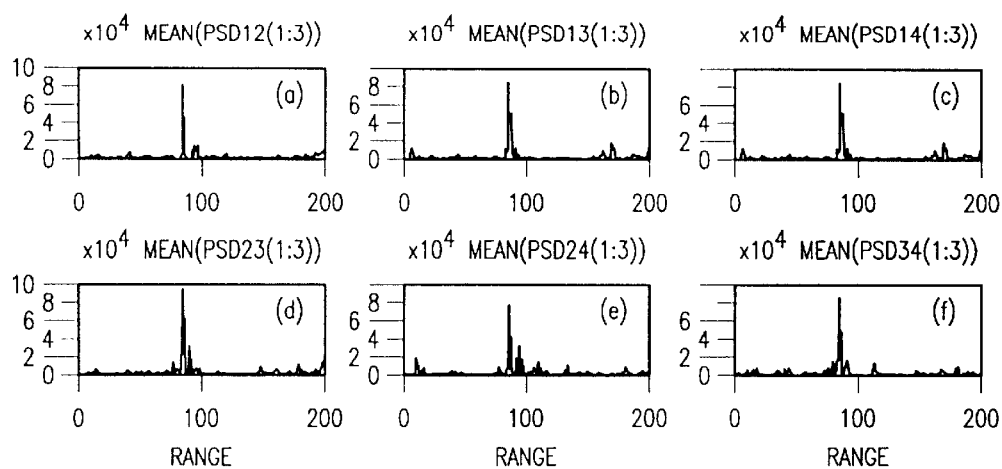
FIG. 14 is a graph of simulation results showing six pairs of distinct cross-correlation between channels.

For the cross-correlation method, $P_{ij}$ in Eq.(9) used the average of the DC and the first two harmonic components at range r=85 of the 6 PSD pairs, as shown in FIG. 14.

FIG. 14 is a graph of simulation results showing six pairs of distinct cross-correlation between channels. The scale constant in Eq.(9) is estimated as $C_d=0.009$. The estimated phase differences are $\theta_{24}=\Phi_{12}-\Phi_{14}=0.47$ (radian) and $\phi_{12}=\Phi_{14}-\Phi_{24}=-0.13$ (radian). The estimation error is less than 3%. Therefore, the cross-correlation method seems to provide better performance than the direct method.

Doppler-Shifting and De-Trending

For target detection in the amplitude-domain, the optimal case is that the target Doppler frequency is centered at one of the Doppler filters. Otherwise, the target energy will be picked up by several nearby filters causing "leakage". However, this is not true for target detection in the phase-domain. This is illustrated below with respect to the two point targets with different Doppler frequencies shown in FIG. 15.

Figure 15:
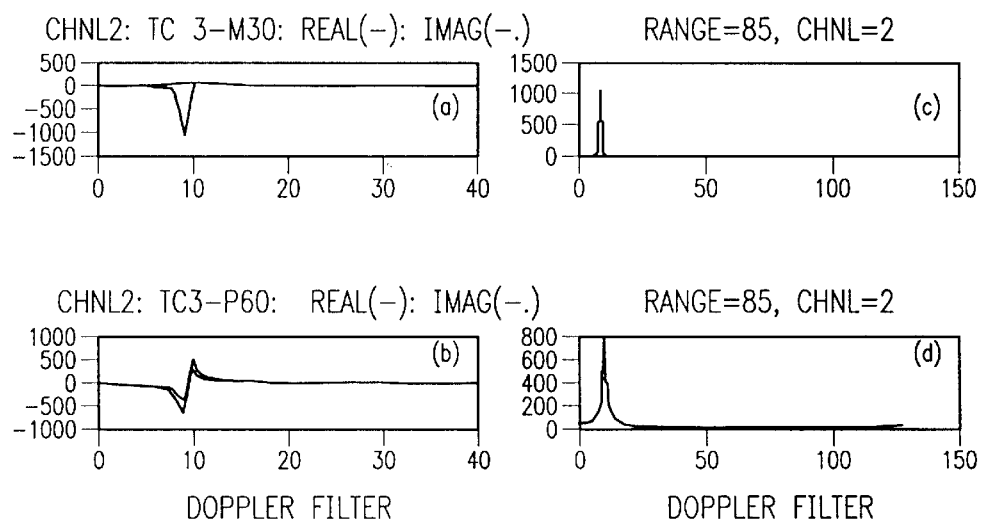
FIG. 15 is a diagram showing the returns of two point targets with different Doppler frequencies.

FIG. 15 is a diagram showing the returns of two point targets with different Doppler frequencies. One has a Doppler frequency of 2.35K Hz (the interval between two Doppler filters is 258 Hz), and thus is 30 Hz away from the number 9 Doppler filter (we call this target T-30). The other target has a Doppler frequency of 2.44K Hz, and thus is 120 Hz away from the number 9 Doppler filter (we call this target T-120). The real and imaginary functions of T-30 and T-120 are plotted at FIGS. 15(a) and (b), respectively, and the amplitudes of T-30 and T-120 are, respectively, plotted at FIGS. 15(c) and (d). T-30 has higher amplitude at the center Doppler filter while T-120 has more energy spread in nearby filters caused by the leakage. It is this spread energy that generates high values of low frequency components for target detection in phase-domain.

Figure 16:
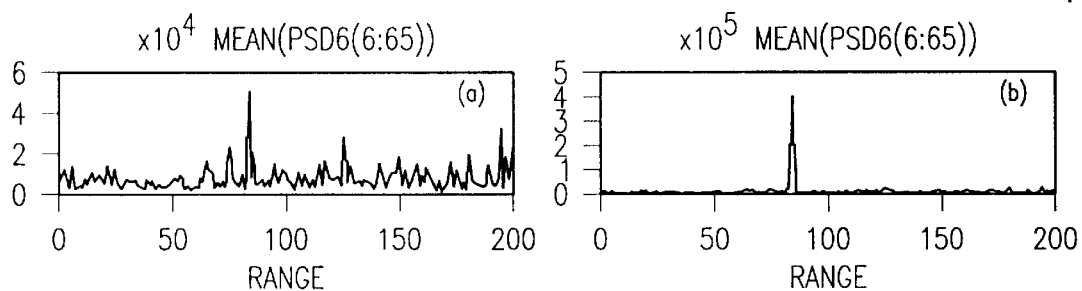
FIG. 16 shows the signals used to detect targets with different Doppler frequencies in accordance with the present teachings.

FIG. 16 shows the signals used to detect targets with different Doppler frequencies in accordance with the present teachings. FIG. 16 shows target detection in the phase-domain for two targets: T-30 and T-60 (Doppler frequency of 2.38K Hz) using Method 2 of the present invention. It is seen that T-60 (FIG. 16(b)) can provide much higher values of low frequency components than T-30 (FIG. 16(a)) does for target detection. In general, the optimal Doppler frequency for target detection in the phase-domain is the frequency located at the middle of two nearby Doppler filters. Note that this is the worst case for target detection in the amplitude domain.

As can be seen in FIG. 16(b), target T-120 has a Doppler frequency close to optimal. To obtain reliable target detection in the phase-domain, Doppler-shifting can be used to move the arbitrary target Doppler to the middle of Doppler interval by multiplying a Doppler shift frequency to the received RF signal, that is, by multiplying a phase angle which is linearly increased with the increase of the RF pulse repetition intervals (PRIs) within a Coherent Processing Interval (CPI).

However, Doppler-shifting will also increase Fast Fourier Transform (FFT) leakage caused by the clutter and receiver noise. The leakage from clutter will, in turn, generate high values of low frequency components from PSD signal and thus reduces SCNR for target detection in the phase-domain. De-trending can be used here to reduce the leakage caused by clutter while keeping strong low frequency components due to the targets. Note that some different parameter settings can also generate high clutter leakage. For example, a CPI with smaller PRI number (e.g., 32 or 64) will generate higher clutter leakage than a CPI with larger PRI number (e.g., 128 or 256).

As shown in FIG. 5(b), the values of the phase function for a low leakage clutter return change fast around the zero, which means that the trend of the real and imaginary values is close to zero along the Doppler direction. On the other hand, for a signal with high leakage the trends of the real and imaginary functions will linearly or non-linearly deviate away from the zero. FIGS. 3 and 15(b) showed such an example (a non-linear trend). To apply the de-trending technique, first choose a duration in the Doppler direction where the target trends are almost decayed close to zero. The trends measured in this duration will mostly reflect the trends caused by the clutter leakage. Then linearly or non-linearly de-trend the real and imaginary functions of the whole range-Doppler map along the Doppler direction. In this way, the clutter leakage is reduced but the high values of low frequency components of the target in the phase-domain are maintained.

A simulation has been conducted using a RF signal with a T-30 target, a strong monostatic clutter return, and a normal level receiver noise. The target detection result is shown in FIG. 16(a), where the target phase signal was quite weak. In the $2^{nd}$ simulation, a 30 Hz Doppler shift was applied to the same RF signal without de-trending.

FIG. 17 shows the linear de-trending of complex-valued range-Doppler map resulting from the application of a standard detrending algorithm taken from MATLAB. The real and imaginary functions of five overlapped range slices are plotted in FIGS. 17(a) and (c), respectively. It is seen that the trends of both functions are deviated away from zero. The target detection result is shown in FIG. 18(a).

FIG. 18 is a diagram which illustrates target detection before and after de-trending in accordance with the inventive method. Although the target has a relatively high return value, the clutter leakage causes even higher return values by comparing FIG. 18(a) with FIG. 16(a). In the $3^{rd}$ simulation, a 30 Hz Doppler shift is applied to the RF signal and then a linear de-trending is conducted. It is seen in FIGS. 17(b) and (d) that the trends caused by clutter leakage have been corrected towards zero.

The target detection result is shown in FIG. 18(b). The high return values by the clutter leakage as shown in FIG. 18(a) have been significantly suppressed by the linear de-trending, and the target return is maintained with a high value as shown in FIG. 18(b). By comparing FIG. 18(b) with FIGS. 16(a) and (b), it is evident that the de-trending can significantly increase the target phase signal. The result using a T-30 target with Doppler-shifting and de-trending is as good as the result using a T-60 target.

TARGET DETECTION USING REAL CLUTTER RETURN DATA

In the simulations discussed above, the monostatic clutter return data were generated based on high fidelity clutter models. The following data relates to the use of real measured radar clutter data to test target detection methods in the phase-domain. The radar clutter data has the following illustrative parameters:

1). Antenna looking up 5 degrees (3 dB pt. on the ground);
2). Antenna sitting approx. 30 ft above water;
3). Antenna scan rate=540 degrees/second;
4). AZ beam width=2 degrees, EL beam width=10 degrees;
5). Range-gate size=approx. 100 ft (0.2 microseconds);
6). PRI=approx. 62 microseconds;
7). Data is coherent over the entire observation interval for more than 2000 PRIs (flexibility to choose CPI time);
8). Data is 12 bits long, and the receiver noise is about 10 counts.

FIG. 19 is a diagram showing the range-Doppler function of illustrative radar clutter return data using a PRI length from 127 to 256. It is evident that there are strong clutter returns at the low range-gate and low Doppler areas. The Phalanx radar has only single antenna channel, and thus can not conduct spatial cross-correlation which is the process required for Method 1 and Method 2 developed for radar with multiple antenna channels. Nevertheless, since very long coherent PRIs (more 2000) collected by the Phalanx single antenna channel are available, it is possible to conduct temporal cross-correlation between different CPIs collected at different time by the same cannel. Therefore, Method 1 and Method 2 as disclosed herein can be applied to this radar data.

Figure 20:
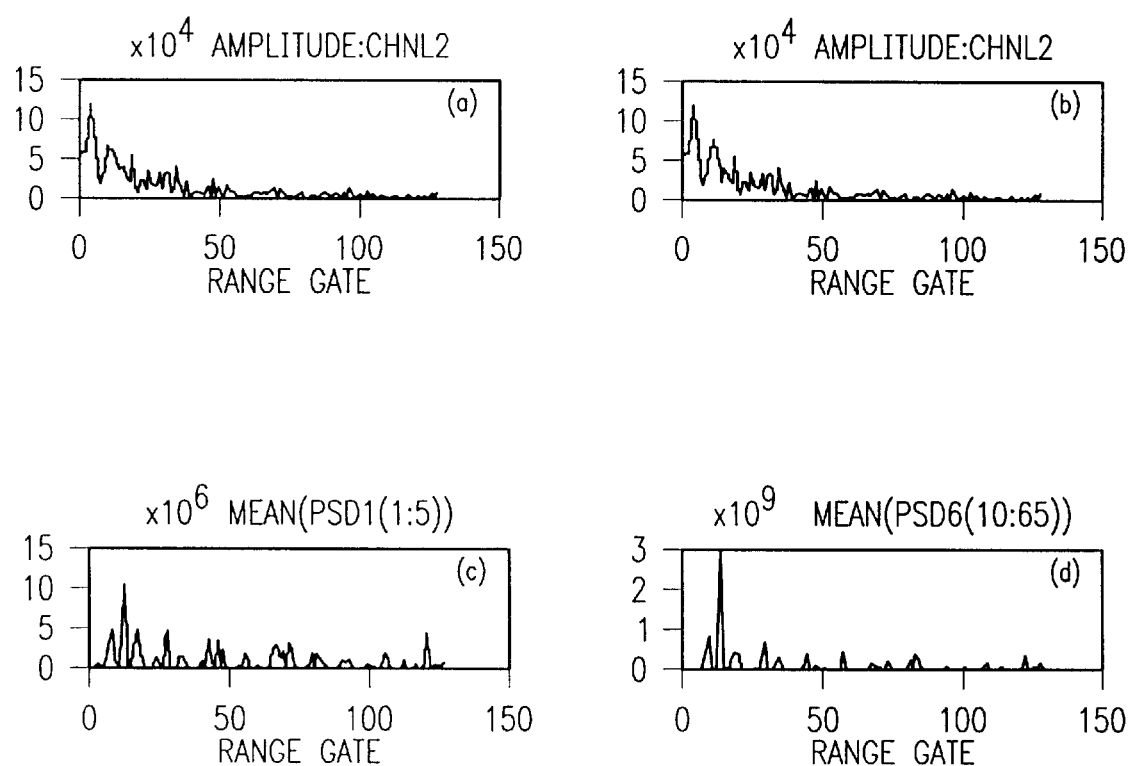
FIG. 20 shows target detection in amplitude and phase-domains for real clutter data utilizing the teachings of the present invention.

FIG. 20 shows target detection in amplitude and phase-domains for real clutter data utilizing the teachings of the present invention. In this embodiment, cross-correlation is conducted between two CPIs with a PRI length of 128. One is cut from PRI number 128 to 256, the other from 457 to 585. A point target is put at range-gate number 12 with a Doppler frequency of 315 Hz. The PRF is 16.129K Hz, and thus the interval between two nearby Doppler filters is 16.129K Hz/128=126 Hz. Therefore, the target is located at the middle between the number 2 and 3 Doppler filters, and is totally embedded in the strong clutter returns. The SCNR in amplitude-domain is −5.03 dB (0.56) for the first CPI, and is −3.5 dB (0.67) for the second CPI. The 1-D slice cut at Doppler d=2 from the clutter amplitude map (FIG. 19) is shown in FIG. 20(a). The 1-D slice cut at the same location for the RF signal including the point-target discussed above, is shown in FIG. 20(b).

Obviously this target is totally embedded in the clutter and is therefore not detectable in the amplitude-domain. To apply the target detection techniques in the phase-domain in accordance with the present teachings, we first apply the de-trending technique to remove some of the clutter leakage and then use Method 1 and Method 2 to detect the target in phase-domain. We only used a small PRI number 128 (out of more than 2000) for a CPI, and thus the FFT leakage is higher than using a lager PRI number. The Doppler duration chosen for measuring the trends is from d=13 to d=35 for the $1^{st}$ CPI, and from d=10 to d=20 for the 2nd CPI.

The results are shown in FIGS. 20(c) (Method 1) and 20(d) (method 2). The target can be easily detected at range r=12 in the phase-domain. The SCNR in the phase-domain is 23.9 dB (15.7) using Method 1, and is 56.3 dB (654.6) using Method 2.

In the illustrative embodiment, simple correlation and spectrum estimation (periodogram) techniques are used to extract the phase signals. In addition, some simple de-trending techniques are used to correct the clutter leakage of Doppler FFT. Further improved results may be expected from the use of more advanced spectrum estimation and FFT leakage correction techniques.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for detecting a target in clutter comprising:

first means for receiving a complex return signal of an electromagnetic pulse having a real and an imaginary component;

second means for extracting from the imaginary component information representative of the phase component of the return signal; and third means responsive to the phase component for detecting the target.

2. The invention of claim 1 further including means responsive to the phase component for detecting a direction of the target.

3. The invention of claim 1 wherein the first means includes a radar receiver.

4. The invention of claim 3 wherein the second means includes means for providing a phase range-Doppler map.

5. The invention of claim 3 wherein the second means includes means for determining a power spectral density of the phase component of the return signal.

6. The invention of claim 5 wherein the second means includes means for performing a cross-correlation of power spectral density of the phase component of the return signal between different antenna-subarray quadrant channels.

7. The invention of claim 6 wherein the second means includes means for averaging the cross-correlated power spectral density of the low frequency components of the return signal.

8. The invention of claim 1 wherein the second means includes means for performing a cross-correlation of the phase component of the return signal between different antenna-subarray quadrant channels.

9. The invention of claim 8 wherein the second means includes means for averaging the cross-correlated power spectral density of the low frequency components of the return signal.

10. The invention of claim 1 wherein the third means includes means for tracking the target.

11. A system for detecting a target in clutter comprising:

a radar receiver adapted to receive a complex return signal of an electromagnetic pulse having a real and an imaginary component;

a signal processor for extracting from the imaginary component information representative of the phase component of the return signal; and a target detector responsive to the phase component for detecting the target.

12. A method for detecting a target in clutter including the steps of:

receiving a complex return signal of an electromagnetic pulse having a real and an imaginary component;

extracting from the imaginary component information representative of the phase component of the return signal; and utilizing the phase component to detect the target.

13. The invention of claim 12 further including the step of using the phase component to ascertain a direction of the target.

14. The invention of claim 12 further including the step of providing a phase range-Doppler map.

15. The invention of claim 12 further including the step of determining a power spectral density of the phase component of the return signal.

16. The invention of claim 15 further including the step of performing a cross-correlation of power spectral density of the phase component of the return signal between different antenna-subarray quadrant channels.

17. The invention of claim 16 further including the step of averaging the cross-correlated power spectral density of the low frequency components of the return signal.

18. The invention of claim 12 further including the step of performing a cross-correlation of the phase component of the return signal between different antenna-subarray quadrant channels.

19. The invention of claim 18 further including the step of averaging the cross-correlated power spectral density of the low frequency components of the return signal.

20. The invention of claim 12 further including the step of tracking the target.

* * * * *